United States Patent [19]

Javeri

[11] 4,241,708

[45] Dec. 30, 1980

[54] IGNITION SPARK TIMING CIRCUIT WITH SWITCHABLE HYSTERESIS

[75] Inventor: Rupin J. Javeri, Elk Grove Village, Ill.

[73] Assignee: Motorola, Inc., Schaumburg, Ill.

[21] Appl. No.: 29,505

[22] Filed: Apr. 12, 1979

[51] Int. Cl.³ ............................................... F02P 5/04
[52] U.S. Cl. ..................................... 123/418; 123/424
[58] Field of Search ............ 123/117 D, 117 R, 148 E

[56] References Cited

U.S. PATENT DOCUMENTS

| | | | |
|---|---|---|---|
| 3,989,024 | 11/1976 | Lai | 123/117 R |
| 4,016,843 | 4/1977 | Porrego | 123/117 R |
| 4,020,807 | 5/1977 | Del Zotto | 123/117 R |
| 4,033,272 | 7/1977 | Henrich | 123/117 R |
| 4,104,997 | 8/1978 | Padgitt | 123/117 R |
| 4,125,097 | 11/1978 | Gunderson | 123/117 R |
| 4,170,209 | 10/1979 | Petrie | 123/117 R |

*Primary Examiner*—Ronald B. Cox

*Attorney, Agent, or Firm*—Phillip H. Melamed; James W. Gillman

[57] ABSTRACT

An ignition spark timing circuit with switchable hysteresis for an internal combustion engine is disclosed. A crankshaft sensor produces a periodic input sensor signal, having a predetermined period, which initiates the action of a programmable voltage slope generator that produces a predeterminedly varying signal. This varying signal serves as an input to a comparator which also receives a switching threshold input, and the comparator output is utilized to determine the time occurrence of spark ignitions. A switchable feedback path is provided between the output of the comparator and its switching threshold input such that hysteresis for the comparator threshold input is provided during critical portions ($T_C$) of the time period of the crankshaft position sensor signal when the comparator is expected to produce output signal transitions that determine the occurrence of spark ignitions. At other portions ($T_N$) of the time period of the crankshaft position sensor signal, the comparator output cannot affect the threshold input of the comparator.

8 Claims, 4 Drawing Figures

IGNITION SPARK TIMING CIRCUIT WITH SWITCHABLE HYSTERESIS

BACKGROUND OF THE INVENTION

The invention relates generally to the field of ignition spark timing circuits for internal combustion engines, and more particularly to the field of electronic ignition spark timing circuits in which a predetermined advance angle versus engine speed characteristic is produced. U.S. Pat. Nos. 4,104,997 and 4,125,097 illustrate various embodiments of such circuits.

In general prior art electronic spark timing circuits such as those referenced above have provided a tremendous advantage over the previous spark timing circuits in which the advance angle versus engine speed variation was mechanically created by using a centrifical force created by the engine crankshaft rotation to physically displace a cam which controlled the amount of engine spark advance. In the electronic spark timing ignition circuits illustrated in the two previously referenced U.S. patents, generally a varying signal, an analog signal in both patents, serves as an input to a switching device or comparator which either has an internal switching threshold (such as the base emitter junction voltage of a transistor) or an external switching threshold (such as an external voltage applied to one of two terminals of a comparator). These prior art circuits have either provided no hysteresis for the switching devices, such as the ignition circuit shown in U.S. Pat. No. 4,125,097, or they have provided a constant hysteresis effect for the switching device, such as the comparator utilized in U.S. Pat. No. 4,104,997.

In general, providing a hysteresis effect for the switching comparator has been desired since this feature minimizes noise falsing of the switching comparator. In other words, once the comparator has determined that it should change its state, the comparator will remain in the changed state until a different and substantially larger switching threshold is reached. It has been found that while hysteresis is a desirable quality for the comparator utilized in U.S. Pat. No. 4,104,997, this hysteresis characteristic of the comparator will result in limiting the sensitivity of the comparator. This occurs because due to the hysteresis effect, which prevents small magnitude noise pulses from disrupting the operation of the comparator, the comparator will also ignore small amplitude signals which may be generated as the proper inputs to the comparator during extremely high engine speeds. Thus in order to have the prior art spark timing circuits function properly at high engine speeds, the noise immunity of these circuits had to be compromised.

SUMMARY OF THE INVENTION

An object of the present invention is to overcome the above mentioned disadvantage by insuring proper operation of an electronic spark timing ignition circuit, even at very high engine speeds, while still providing substantial noise immunity during the time at which this noise immunity is most needed.

In one embodiment of the present invention an ignition spark timing circuit for an internal combustion engine is provided. The spark timing circuit comprises: sensor means for providing a periodic input sensor signal having a frequency and period proportional to the speed of an engine, the input sensor signal having leading and trailing edges at least one of which is related to predetermined angular positions of a crankshaft of the engine; and ignition timing means for receiving said input sensor signal and producing a periodic spark timing ignition signal having time occurrences controlling and directly corresponding to the time occurrences of spark ignitions, said ignition timing means including a comparison means having an output which determines the occurrence of spark ignitions by comparing at least two comparison input signals during a critical portion of each period of said input sensor signal, said ignition timing means including input circuitry for providing during each input sensor signal period a first predeterminedly varying signal as one of the inputs to said comparison means and a predetermined threshold level as another of the inputs to said comparison means, wherein the improvement comprises that said comparison means input circuitry includes switchable hysteresis means for having said threshold level being a function of the output of said comparison means, thus exhibiting hysteresis for said comparison means, during said critical portion of each period of said input sensor signal and for having said threshold level being independent of the output of said comparison means during an other portion of each period of said input sensor signal, whereby substantial noise immunity is provided for said comparison means during the critical portions of said input sensor signal period during which said comparison means determines the occurrence of spark ignitions, while during the other portion of each period of said input sensor signal said comparison means is permitted to have a low level, output independent threshold level which insures proper operation of said comparison means even when said predeterminedly varying signal has small peak amplitudes.

Basically, a crankshaft position sensor provides a periodic input sensor signal which has logic states corresponding to portion of the period of crankshaft rotation. Therefore this signal has a duty cycle (50%) which is a constant percentage of the period of the sensor signal. This signal serves as a control signal which controls the operation of the switchable hysteresis means which comprises a selective signal feedback path between the output of a comparator and the input threshold level of the comparator. In this manner, the comparator is allowed to exhibit a hysteresis characteristic only during a precise portion of the input sensor signal period. It is in this portion of the input sensor signal period that the comparator compares a predeterminedly varying signal received from a programmable slope generator device with a predetermined threshold level to determine spark occurrence. Thus a hysteresis characteristic for the comparator is implemented during the portion of time that the comparator is utilized to produce an output transition which controls the production of spark ignition, whereas during the rest of the time the comparator will not exhibit a hysteresis characteristic and the comparison threshold level will remain fixed at a low level. In this manner, the comparator is able to provide substantial noise immunity during the critical portion of the sensor signal period, while being able to function properly when the programmable slope generator, at high engine speeds, produces only small magnitude predeterminedly varying signals which are received as inputs by the comparator.

BRIEF DESCRIPTION OF THE DRAWINGS

For a more complete understanding of the present invention reference should be made to the drawings, in which:

FIGS. 4A–M are a series of graphs illustrating the signal waveforms produced during the operation of the circuit shown in FIG. 1.

DESCRIPTION OF THE PREFERRED EMBODIMENT

Figure 1:
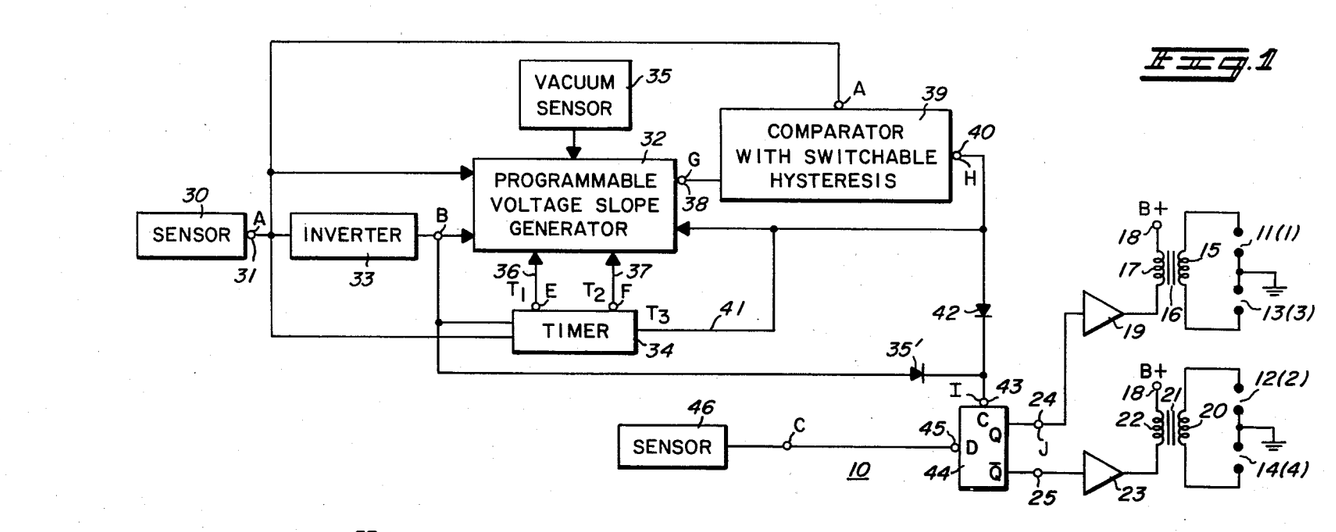
FIG. 1 is a combined block and schematic diagram of an ignition spark timing circuit for an internal combustion engine which utilizes the present invention.

FIG. 1 illustrates a spark timing ignition circuit 10 for a 4 cylinder (typical) internal combustion engine (not shown). The spark timing ignition circuit 10 generally corresponds to the spark timing ignition circuit illustrated in U.S. Pat. No. 4,104,997 with the exception that a comparator 39 has been provided which has switchable hysteresis circuitry which will be subsequently described. While the present invention will be described as an improvement to the specific embodiment shown in U.S. Pat. No. 4,104,997, it should be noted that the switchable hysteresis invention described herein is not limited in its application to such a specific spark timing circuit.

Since the operation of circuit 10 is substantially similar to the invention described in U.S. Pat. No. 4,104,997, the teachings of the specification, claims and drawings of that patent are hereby incorporated by reference so as to more fully describe the operation of the present invention.

Basically the circuit 10 provides ignition spark timing pulses to spark gaps 11, 12, 13 and 14 which correspond to the first, second, third and fourth cylinders of a 4 cycle engine, respectively. The numbering of the cylinders indicates the firing order of the cylinders with respect to their rotation of an engine crankshaft (not shown). The spark gaps 11 and 13 each have an end terminal connected to ground and an end terminal connected to each end of a secondary winding 15 of a transformer 16 which has a primary winding 17 coupled between a B+ terminal 18 and the output of a driver circuit 19. Similarly the spark gaps 12 and 14 each have terminals connected to ground and terminals connected to a secondary winding 20 of a transformer 21 having a primary winding 22 coupled between the B+ terminal 18 and the output of a driver circuit 23. The input to the driver circuit 19 is coupled to a terminal 24 and the input to the driver circuit 23 is coupled to a terminal 25.

Basically the spark timing ignition circuit 10 produces complementary alternating high and low logic signals at terminals 24 and 25 which result in inducing inductive spark energy across the spark gaps of the cylinders at predetermined times of the cylinder compression cycle with respect to the crankshaft rotation. Spark energy is coupled to the first and third engine cylinders in a complementary fashion such that the first time the secondary coil 15 produces a large amount of spark energy, the first cylinder (corresponding to spark gap 11) will be in its compression cycle while the third cylinder (corresponding to spark gap 13) will be in its after ignition (exhaust) cycle. Thus the initial excitation of the secondary coil 15 will result in igniting the fuel mixture in the first cylinder and no ignition of the spent fuel mixture in the third cylinder. However, upon the second excitation of the secondary coil 15, the third cylinder will be in its compression cycle position and therefore be ignited by a spark signal, whereas the first cylinder will be in its after ignition (exhaust) cycle and therefore not be ignited. The operation of the cylinders 2 and 4 (spark gaps 12 and 14) is identical. Thus the basic function of the spark timing circuit 10 is to supply terminals 24 and 25 with complementary signals which have the desired phase relationships with respect to the cycle positions of the cylinders of the engine. These positions are directly related to the rotational position of the crankshaft of the engine.

Essentially a periodic spark control signal 66 (see FIG. 4I) is produced at terminal 43(I) by the circuit 10. The signal 66 has low logic states 66' and high logic states 66" and the time occurrence $T_4$ of the termination of the logic state 66' at leading edges 66a determine the time occurrences of spark ignitions. High energy pulses are produced by the coils 17 and 22 at the times $T_4$ and these pulses are directed to the appropriate spark plugs. Components 11–25 are of well known conventional designs and therefore will not be described any further.

The spark timing circuit 10 includes a crankshaft sensor 30 which produces a periodic input sensor signal 52 at a terminal A (31) which has a frequency and period T that is proportional to the speed of the engine. The input sensor signal comprises a series of pulses which have leading and trailing edges with at least the leading edge 52a directly related to a predetermined angular position of a crankshaft of the engine. Such crankshaft sensors are known and preferably comprise Hall effect sensors and appropriate circuitry. The input sensor signal 52 at terminal A has a duty cycle that is a constant percentage 50% of the period T of the crankshaft rotation. The terminal 31 is directly coupled to a programmable voltage slope generator 32, an inverter circuit stage 33, a timer circuit 34 and the anode of a diode 35'. The inverter 33 produces an output signal 53 at a terminal B which is directly connected as an input to the programmable voltage slope generator 32 and the timer 34.

A vacuum sensor 35 senses the engine manifold pressure and is coupled to the voltage slope generator 32. The timer 34 has two connections 36 and 37, for coupling timing pulses $T_1$ and $T_2$ produced at terminals E and F, respectively, to the slope generator 32. The slope generator produces a voltage 62 at an output terminal 38 (G) which has a programmable slope (rate of change as a function of time).

The terminal 38 is coupled to the input side of a comparator 39 which has switchable hysteresis circuitry and which also receives an internal switching threshold voltage as an input. The comparator 39 produces a DC level shift when the signal at terminal 38 changes its polarity with respect to the threshold voltage, and the level shift results in producing an output signal 65 at an output terminal H (40). Thus the comparator 39 essentially functions as a DC level comparator but comparator 39 has novel switchable hysteresis circuitry which will be described in detail subsequently. The terminal H is directly coupled to the slope generator 32 and this connection serves as a hold loop for the generator 32 and maintains the voltage at the terminal 38 constant until the programmable slope generator 32 has been reset. The comparator 39 also receives an input from a direct connection to the terminal A.

The timer 34 is coupled to the terminal H by a connection 41 and the timer produces an inhibit signal $T_3$ on this connecting line which prevents the occurrence of a high voltage at the terminal H under certain (slow speed) conditions. The terminal H is also connected to the anode of a diode 42. The cathodes of the diodes 42 and 35' are both connected to a clock terminal 43 of a D type flip-flop 44 which has a Q output connected to terminal 24 (J) and a $\overline{Q}$ output connected to terminal 25. A data input terminal 45 of the flip-flop is directly connected to a sensor 46 which produces an output signal that provides information as to the rotational position of the crankshaft of the engine.

The sensor 30 is contemplated as producing a signal 52 whose leading and trailing edges have a fixed relationship to the crankshaft rotational position which corresponds to a specific cylinder compression cycle position for each of the cylinders. In the present embodiment of the invention there are four cylinders, each being fired with a proper fuel mixture in compression once for every 720° of crankshaft rotation. The sensor 30 produces an AC signal (FIG. 3A) having a total of four leading and trailing edges which occur during every 360° of crankshaft rotation and the phase difference between the leading edges of the signal produced by sensor 30 and the spark timing signal 66 at terminal 43 produced by the circuit 10 is the advance angle $\alpha$. The sensor 46 produces a signal 54 (FIG. 3C) which merely contains information as to when a particular cylinder, such as cylinder one (spark gap 11), is in either the compression or expansion part of its cycle. Thus the period of the signal produced by the sensor 46 is equivalent to 360° of crankshaft rotation.

It is contemplated that appropriate dwell control circuitry may be incorporated with the present invention, but such circuitry is not essential to the operation of the present invention.

Figure 4:
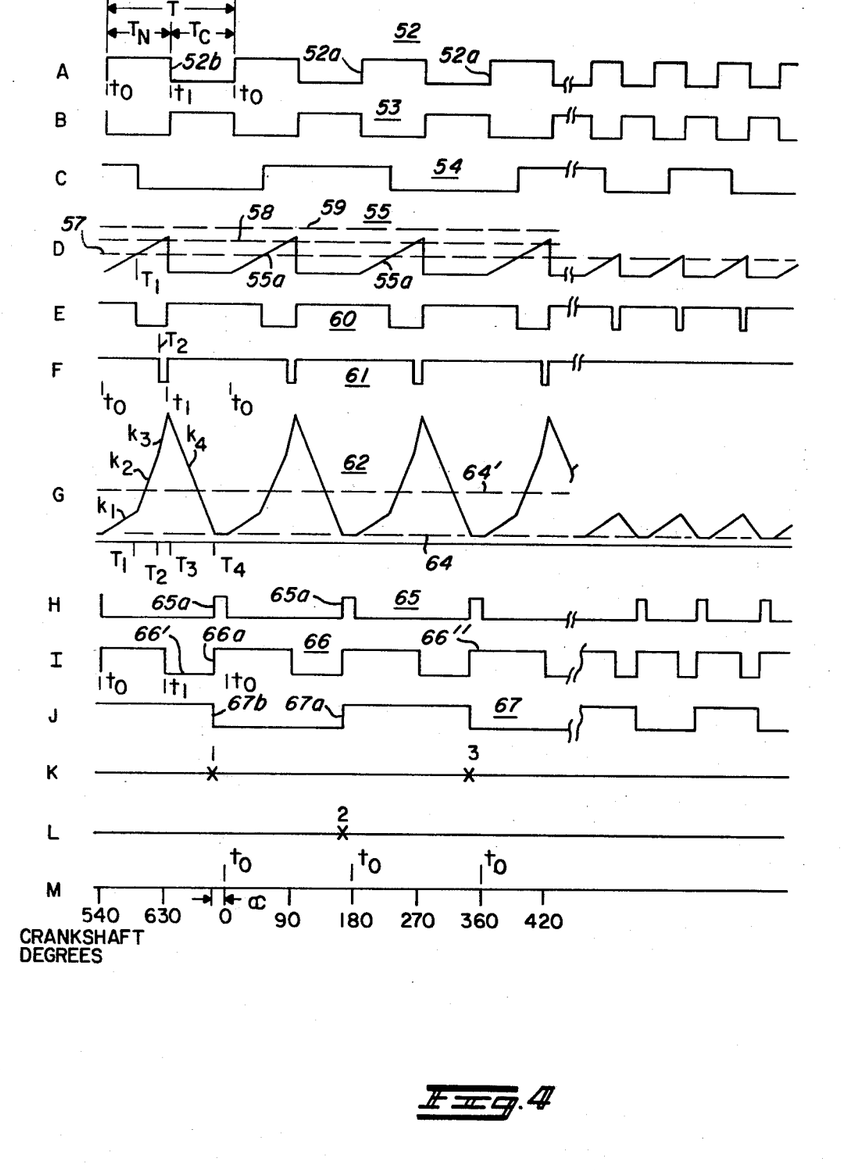

The signal 52 at the terminal A represents a precise 50% division of the period T between leading edges 52a of the signal 52 into a non-critical initial portion $T_N$ and a subsequent critical portion $T_c$, with the transition between the two portions occuring at times $t_1$ and the leading edges 52a of the sensor signal 52 at the terminal A occuring at times $t_0$. FIGS. 4A and 4B illustrate the waveforms for the signals 52 and 53 present at the terminals A and B, respectively. The phase difference between the times $t_0$ and the time occurrence of spark ignitions (at times $T_4$) produced in accordance with the spark timing control signal 66 at the terminal I represents the advance angle ($\alpha$) produced by the spark timing ignition circuit 10.

The operation of the spark timing ignition circuit 10 illustrated in FIG. 1 will now be described with specific reference to the advance angle versus engine speed transfer characteristics shown in FIG. 2. In order to best understand the operation of the circuit 10 it should be noted that the signal waveforms illustrated in FIGS. 4A through 4J represent the signal waveforms produced at the terminals A through J of the spark timing ignition circuit 10 shown in FIG. 1 and the details of this circuit shown in FIG. 3. FIGS. 4K and 4L illustrate the occurrences of spark ignitions, by Xs, for the engine cylinders. FIG. 4M is a plot engine crankshaft position in degrees of revolution. The vertical axes of the graphs in FIGS. 4A through 4J represent amplitude and the horizontal axes represents time, with the portion of the horizontal axes to the left of a breakpoint 200 representing a slow engine speed condition while the portion of the horizontal ax s to the right of the breakpoint 200 represents a high speed engine condition.

Figure 2:
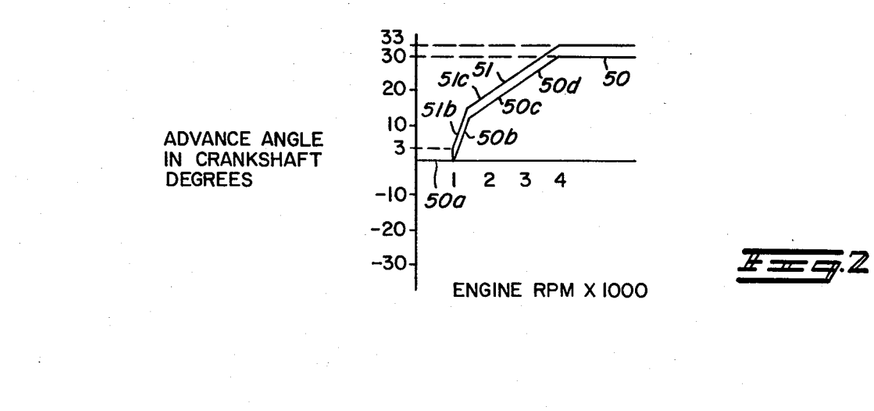
FIG. 2 is a graph illustrating two advance angle versus engine speed characteristics produced by the circuit shown in FIG. 1.

FIG. 2 illustrates two spark timing advance angle versus engine speed characteristics 50 and 51 which are produced by the spark timing circuit 10 illustrated in FIG. 1. A first advance angle versus speed characteristic 50 illustrates the advance relationship created when no vacuum advance is called for by the vacuum sensor 35. A second advance versus engine speed characteristic 51 is illustrated to show how the vacuum sensor 35 will add a predetermined amount of vacuum advance angle to the advance versus engine speed characteristic produced by the circuit 10. The exact configuration for the advance angle versus engine speed characteristics will not be described in detail since these characteristics are described in detail in U.S. Pat. No. 4,104,997. For the present invention it is sufficient to say that both characteristics essentially are a piecewise linear advance angle versus engine speed characteristic having engine speed breakpoints of 1,000, 1,300 and 4,000 RPM with the characteristic 51 being displaced from the characteristic 50 by a fixed amount of advance angle for engine speed above 1,000 RPM.

Figure 3:
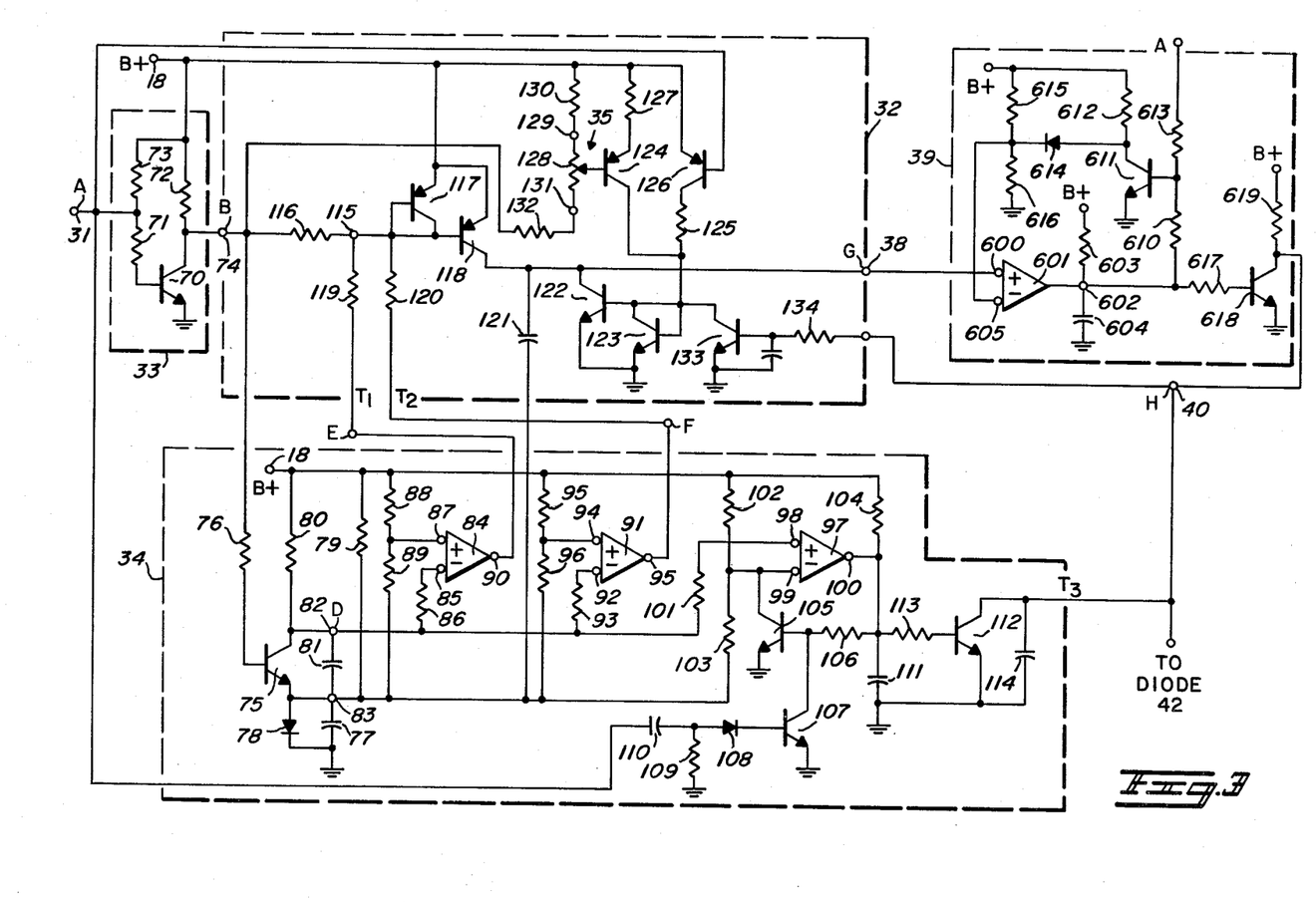
FIG. 3 is a detailed schematic diagram of several of the individual block components shown in FIG. 1.

The operation of the spark timing circuit 10 will initially be described in general terms with respect to how the characteristics 50 and 51 are obtained and specific reference will be made to the waveforms shown in FIGS. 4A through 4J. Subsequently, the internal construction of the components illustrated in FIG. 1 will be generally discussed. It should be noted that all of the components shown in FIG. 1 precisely correspond to identically numbered components in U.S. Pat. No. 4,104,997 with the key exception being the comparator 39 which according to the present invention has been modified to include switchable hysteresis circuitry so as to improve the performance of the spark timing ignition circuit 10. FIG. 3 illustrates a typical embodiment for the inverter 33, the programmable voltage slope generator 32, the timer 34, and the preferred embodiment for the comparator 39 which has switchable hysteresis circuitry. Components and terminals in FIG. 3 corresponding to the components and terminals illustrated in FIG. 1 have been identically numbered, and FIGS. 4A through J illustrate signal waveforms produced at the terminals A through J illustrated in all of the present figures.

The sensor 30 produces a periodic output signal 52 at the terminal A which has a period of T which is inversely proportional to the speed of engine rotation and is directly related to a specific amount of engine crankshaft rotation in degrees of rotation. A plot of crankshaft rotation in degrees is illustrated by a scale ploted in FIG. 4M. The waveform 52 comprises periodic crankshaft position sensing pulses having leading and trailing edges 52a and 52b, repectively, with the leading edge 52a directly corresponding to a precise position of engine crankshaft rotation occurring at times $t_0$.

The signal 52 has a duty cycle within this period T that is equal to a constant percentage ratio (50%) of the period T. In essence, the waveform 52 has a non-critical initial portion $T_N$ during which a high logic state is produced, the duration of the portion $T_N$ being precisely equal to T/2. Subsequently, a low logic state is produced for a critical portion $T_C$ of the period T and this low logic state exists for precisely T/2. The transition between the high logic state and the log logic state occurs at the times $t_1$. Thus the periodic input signal 52 has a duty cycle equal to a fixed division of the period T wherein the duty cycle transition that occurs within the period T occurs at the times $t_1$, whereas the times $t_0$ indicate the occurrence of the leading edges 52a of the signal 52. The components 32 through 42 accomplish the result that logic state transitions occur at times at the terminal 43 (I) which indicate that spark ignitions should be generated at those times, and the operation of those components will now be discussed.

The inverter 33 merely inverts the signal 52 at the terminal A to provide the signal 53 at the terminal B. A typical example of such an inverter is shown in FIG. 3. The programmable voltage slope generator 32 receives both the inverted and non-inverted signals produced at the terminals A and B and, in conjunction with the timer 34, produces a multiple slope waveform 62 at the terminal G which is utilized by the comparator 39 and its switchable hysteresis circuitry to provide the signal 65 at the terminal H. This signal, in conjunction with the signal 52 coupled through diode 35′, provides the input signal 66 to the flip-flop terminal I, and the low to high logic transitions 66a at times $T_4$ determine spark ignitions.

Typical embodiments of the programmable voltage slope generator 32, the timer apparatus 34 and the vacuum sensor 35 are illustrated in FIG. 3, and these typical embodiments directly correspond to the corresponding components found in U.S. Pat. No. 4,104,997. Because the operation of these components in the present invention is nearly identical to their operation in the referenced U.S. patent, detailed operational specifics of these components will not be discussed since that information is available in the issued patent. However the operation of components 32, 34 and 35 will be generally discussed. FIG. 3 also illustrates the preferred embodiment for the comparator 39 which includes switchable hysteresis circuitry. The embodiment of comparator 39 represents a significant improvement over the circuitry illustrated in the issued U.S. patent and therefore the operation and construction of the circuit 39 will be discussed in detail.

Basically, the timer 34 receives the signal 53 at the terminal B and produces in response thereto a ramp shaped signal 55 at the terminal D during the $T_N$ portions of the period T. The signal 55 is applied as an input to three comparators 84, 91 and 97 in order to generate three different fixed time occurrences $T_1$, $T_2$ and/or $T_3$. The comparators 94, 91 and 97 also receive fixed threshold levels 57, 58 and 59, respectively, from resistor dividers. The outputs of comparators 84 and 91 are illustrated as signals 60 and 61 in FIGS. 4E and 4F, respectively. Essentially the timer 34 comprises a time detection means for detecting the passage of three predetermined time intervals $T_1$, $T_2$ or $T_3$ which may occur within the $T_N$ portions of the period T. The waveform 55 is created by the resistor 80 charging up the capacitor 81 during the period $T_N$.

The fixed time detections $T_1$ and $T_2$ are utilized by the programmable voltage slope generator 32 to provide "break-points" in the waveform 62 produced at the terminal G as an output signal for the generator 32. The breakpoints created by the signals 60 and 61 times at $T_1$ and $T_2$, along with the provision for detecting the time $T_3$ whenever the portion $T_N$ is sufficiently long, determine the speeds at which the characteristics shown in FIG. 2 are altered in their engine speed versus advance angle variation. In other words the timer 34 provides circuitry for determining whether the portion $T_N$ is long enough for providing a detection for the fixed times $T_1$, $T_2$ or $T_3$. In response to each one of these detections occurring within the portion $T_N$, the rate of change of the advance angle versus engine speed is altered as shown in FIG. 2. U.S. Pat. No. 4,104,997 explains in detail how this is accomoblished and derives equations which demonstrate the occurrence of this relationship. Since this information is already contained in an issued U.S. patent, those explanations will not be repeated herein in detail.

The operation of the slope generator 32 will now be explained. Referring to FIG. 3, the programmable voltage slope generator 32 at the commencement of the $T_N$ period of the signal 52 at the terminal A starts to charge up the capacitor 121 via the constant current source comprising the transistors 117 and 118 wherein the magnitude of the current produced by the constant current source depends upon the magnitude of the resistor 116. If the portion $T_N$ is sufficiently large such that a fixed time detection $T_1$ occurs within this time period, then the rate of charging of the capacitor 121 will be altered and occur at a faster rate dependent upon the magnitude of the resistor 116 in parallel with the resistor 119. If the portion $T_N$ is of an even greater magnitude such that a time detection of $T_2$ occurs within this time period, then the rate of charging the capacitor 121 will again be altered to an increased rate wherein this increased rate now depends upon the parallel connection of the resistors 116, 119 and 120. These different changing rates are illustrated by the slopes $k_1$, $k_2$ and $k_3$ of signal 62 in FIG. 4G.

At the times $t_1$, the charging constant current source comprising the transistor 117 and 118 will be disabled for the critical portion $T_C$ of period T, whereas the transistor 126 will be turned on resulting in a discharging constant current source comprising the transistors 122 and 123 discharging the capacitor 121 at a rate determined by the resistor 125. This discharging continues until the signal 62 reaches a lower minimum threshold 64 (shown in FIG. 4G) at which time the comparator 39 produces a positive transition 65a in its output signal 65 at the terminal H which results in halting any further discharge of the capacitor 121 by inactivating the constant current source comprising the transistors 122 and 123 due to the signal at the terminal H turning on the transistor 133.

It should be noted that the vacuum sensor 35 essentially comprises a potentiometer 128 whose center tap resistance varies in response to sensed engine pressure. Such sensors are well known. In the present embodiment the variation of the center tap of the potentiometer 128 alters the conductivity of the transistor 124 which uniformly adjusts all of the charging slopes for the waveform 62. This results in producing a uniform shift in the advance angle versus engine speed characteristics such that for one vacuum pressure a characteristic such as 50 shown in FIG. 2 is produced whereas for another sensed vacuum pressure a characteristic such as 51 is produced. A detailed explanation of exactly how uniformly varying the charging slopes of the waveform 62 results in a fixed shift in advance characteristic versus engine speed, as shown in FIG. 2, is contained in issued U.S. Pat. No. 4,104,997, and this feature will not be further discussed herein since it does not form an essential part of the present invention.

The provision for the time detection of the fixed time $T_3$ and the providing of the diodes 35′ and 42 essentially comprise a saftey feature for the present invention which operates in an identical manner to the corresponding structure shown in issued U.S. Pat. No. 4,104,997. These components essentially determine that if the charging period of time $T_N$ exists for an extremely long period of time, corresponding to very low engine speeds (those below 1,000 RPM), such that a time detection of the fixed time $T_3$ occurs within the $T_N$ portion, then a signal will be produced at the terminal H, due to the turning on of the transistor 112, which will prevent the output of the comparator at the terminal H from creating a positive transition for the waveform 65. (It should be noted that the positive transitions 65a in the waveform 65 correspond to the time occurrences ($T_4$, X) of spark ignitions.) Thus whenever a time detection $T_3$ occurs, the output of the comparator 39 will not determine the occurrence of a spark ignition. In this case, the diode 35' will couple the positive transition of the waveform A through the diode to the terminal I and this positive transition at the time $t_0$ will insure providing a spark ignition at a zero advance angle with respect to the time $t_0$. The safety feature just discussed may be implemented in many other manners to provide a zero advance characteristic for very low engine speeds, and the present drawings merely illustrate a typical embodiment for this feature which does not comprise an essential part of the present invention.

The main feature of the present invention deals with the specific construction of the comparator 39, and more particularly deals with providing this comparator with switchable hysteresis circuitry. The preferred embodiment of the comparator 39 is illustrated in FIG. 3. The terminal 38 (G) at which the signal 62 is produced is connected as a positive input terminal 600 of a DC level comparator 601. The output of the comparator 601 is provided at a terminal 602 which is directly coupled through an inverting stage to the output terminal H of the comparator 39. The inverting stage comprises a resistor 617 connected between the terminal 602 and the base of an NPN transistor 618 having its emitter connected to ground, and its collector connected to a B+ terminal through a resistor 619 and directly connected to terminal H. A resistor 603 is coupled from the terminal 602 to a B+ terminal and a capacitor 604 is connected between the terminal 602 and ground to provide for noise quieting of the output of the comparator 601. The comparator 601 has a negative input terminal 605 at which a predetermined switching threshold level is provided. Essentially the comparator 601 receives the varying signal 62 at the terminal 600 and compares this signal to the switching threshold level received at the terminal 605. When the signal at the terminal 600 exceeds that of the signal at the terminal 605, the comparator 601 produces a high logic state at its output terminal 602. Conversely, when the signal at the terminal 600 is below the switching threshold at the terminal 605, a low logic state is produced at the terminal 602. DC comparators such as comparator 601 are well known to those of skill in the art.

The present invention comprises providing a selective feedback path between the terminal 602 and the terminal 605 such that during the critical time portions $T_C$ a hysteresis effect for the comparator 39 is created while during the time portions $T_N$ a switching threshold is provided at the terminal 605 which is independent of the output (at 602) of the comparator 601. The circuitry which implements this selective feedback can generally be considered a switchable hysteresis circuit and comprises a resistor 610 coupled between the terminal 602 and the base of an NPN transistor 611 having its emitter coupled to ground and its collector coupled through a resistor 612 to a B+ terminal. The base of the transistor 611 also receives an input signal through a resistor 613 coupled between the base and the terminal A. A diode 614 has its anode coupled to the collector of the transistor 611 and its cathode coupled to the terminal 605. A resistor 615 is coupled between the terminal 605 and a B+ terminal, and a resistor 616 is coupled between the terminal 605 and ground. The components 610 through 616 essentially form switchable hysteresis circuitry in which a hysteresis characteristic for the comparator 39 is provided during the $T_C$ portions of the period T while a fixed threshold level for the terminal 605 is maintained for the $T_N$ portions of the period T. The operation of the switchable hysteresis circuitry will now be discussed in detail and specific references with respect to FIG. 4G will be made since that figure illustrates the various switching thresholds supplied to the terminal 605 by the switchable hysteresis circuitry.

Essentially, when the signal 52 at the terminal A exhibits its low logic state level during the period $T_C$, the circuitry 610 through 616 creates a hysteresis loop for the comparator 601. This means that when, during the $T_C$ portions, the output of the comparator 601 is high at the terminal 602, the transistor 611 will be turned on in response thereto. This results in setting the switching threshold level at the terminal 605 to a DC level 64 totally determined by the resistor divider network comprising the resistors 615 and 616. This threshold level 64 is illustrated in FIG. 4G. If the output of the comparator 601 is switched to its low level state during the portion $T_C$, then the transistor 611 will be turned off in response to the output of the comparator 601, and this will result in altering the threshold level provided at the terminal 605 to a new higher threshold level 64' which is essentially determined by the parallel combination of the resistors 612 and 615 in conjunction with the resistor 616. This higher threshold level corresponds to the level 64' in FIG. 4G. Thus the circuitry in 610 through 616 of the comparator 39 does implement a hysteresis characteristic for the comparator 601 during the $T_C$ portions of the period T. This hysteresis characteristic essentially provides substantial noise immunity for the spark ignition circuit. This is because during the portion $T_C$, the waveform 62 is declining at a fixed rate ($k_4$) and when this signal 62 reaches the threshold level 64, the output of the comparator 601 will change its state at times $T_4$ (as illustrated by the inverse of the waveform 65 in FIG. 4H). As was previously mentioned, the times $T_4$ of the waveform 65 result in the generation of a spark ignition. By providing hysteresis during $T_C$, noise impulses which may be received by the comparator 601 at the terminal 600 during $T_C$ will have a minimal effect on the output of the comparator 601 once the transition at $T_4$ has occurred. This is because any noise pulses which are then superimposed upon the waveform 62 will now have to have a magnitude which exceeds the higher threshold level 64' in order to cause a reversal of the switching state of the comparator 601. Thus during the critical portion $T_C$ during which the spark ignition occurrence information is developed, the comparator 601 has been provided with substantial noise immunity by providing hysteresis. It should be noted that issued U.S. Pat. No. 4,104,997 also provided hysteresis for the switching level of its comparator.

The present invention concerns not only providing hysteresis for its comparator 601 during the critical portion $T_C$ of the period T during which spark occurrence information is generated, but also for providing a constant, low, output independent, threshold switching level for the comparator during the portions $T_N$. This insures the proper operation of the present circuitry at very high engine speeds, and this feature will now be discussed in detail.

The waveforms in FIGS. 4A through 4J to the right of breakpoint 200 illustrate the waveforms produced at a substantially higher engine speed than the engine speed which produced the waveforms to the left side of the time axis breakpoint 200. The waveforms on the right illustrate that at very high engine speeds, the peak magnitudes of the signal 62 produced at the terminal G (38) will be extremely small. If the comparator 601 is provided with substantial noise immunity by making the hysteresis level 64' substantially greater than the low switching threshold level 64, this will result in having the comparator 601 fail to switch logic states at very high engine speeds. If the level 64' is made smaller to insure the switching of the comparator 601, then the noise immunity provided by the hysteresis characteristic of the comparator will be degraded.

The present invention avoids compromising the noise immunity of the comparator 39 during the critical $T_C$ portions of the period T and also provides for insuring that the comparator 39 operates properly at high engine speeds. This is accomplished by implementing the hysteresis characteristic for the comparator 39 only during the critical portion $T_C$ of the period T, and providing a constant low level switching threshold 64 as the switching threshold input to the terminal 605 of the comparator 601 during the rest of the period T (the $T_N$ portions of the period T). This is accomplished by applying the waveform 52 (at terminal A) through the resistor 613 to the transistor 611. This results in maintaining the transistor 611 on throughout the $T_N$ portion of the period T. The result of this is that the output of the comparator 601 will not have any effect on the switching threshold maintained at the terminal 605 during the period $T_N$ since the voltage of the terminal 605 will be completely determined by just the resistors 615 and 616 throughout this period. This insures that the comparator 601 output at terminal 602, corresponding to the inverse of the signal 65 at the terminal H, will have the proper waveform even at high engine speeds, while during the critical portions $T_C$ during which the time occurrence of spark ignitions is determined, substantial noise immunity for the output of the comparator 601 can be provided. Thus the present invention, by its use of switchable hysteresis circuitry for the comparator 39, has provided an improved spark ignition system as compared to the system illustrated in the issued U.S. Pat. No. 4,104,997.

The improved signal output 65 provided at the terminal H (which contains the spark ignition occurrence information contained in the positive transitions 65a) is combined with the waveform 52 at the terminal A via the diodes 42 and 35' to produce the composite signal 66 at the terminal I. This signal contains positive transitions 66a directly corresponding in time ($T_4$) to the transitions 65a which determine spark occurrence. The signal 66 provides the input to the flip-flop 44 which creates the spark drive signals at the terminals 24 and 25. FIG. 4J illustrates one such signal as signal 67. In this manner, the present ignition system 10 insures that the spark ignitions occur at the proper times while providing substantial noise immunity and insuring proper operation at high engine speeds.

While I have shown and described a specific embodiment of this invention, further modifications and improvements will occur to those skilled in the art. All such modifications which retain the basic underlying principles disclosed and claimed herein are within the scope of this invention.

I claim:

1. An ignition spark timing circuit for an internal combustion engine, comprising:

sensor means for providing a periodic input sensor signal having a frequency and period proportional to the speed of an engine, the input sensor having leading and trailing edges at least one of which is related to predetermined angular positions of a crankshaft of the engine; and ignition timing means for receiving said input sensor signal and producing a periodic spark timing ignition signal having time occurrences controlling and directly corresponding to the time occurrences of spark ignitions, said ignition timing means including a comparison means having an output which determines the occurrence of spark ignitions by comparing at least two comparison input signals during a critical portion of each period of said input sensor signal, said ignition timing means including input circuitry for providing during each input sensor signal period a first predeterminedly varying signal as one of the inputs to said comparison means and a predetermined threshold level as another of the inputs to said comparison means, wherein the improvement comprises that said comparison means input circuitry includes switchable hysteresis means for having said threshold level being a function of the output of said comparison means, thus exhibiting hysteresis for said comparison means, during said critical portion of each period of said input sensor signal and for having said threshold level being independent of the output of said comparison means during an other portion of each period of said input sensor signal, whereby substantial noise immunity is provided for said comparison means during the critical portions of said input sensor signal period during which said comparison means determines the occurrence of spark ignitions, while during the other portion of each period of said input sensor signal said comparison means is permitted to have an output independent threshold level which insures proper operation of said comparison means even when said predeterminedly varying signal has small peak amplitudes.

2. An ignition spark timing circuit according to claim 1 wherein said switchable hysteresis means comprises a controllable gate device having input and output terminals coupled between the output of said comparison means and the input of said comparison means which receives said threshold level.

3. An ignition spark timing circuit according to claim 2 wherein said sensor means includes means for providing said input sensor signal with a duty cycle which is a constant percentage of the period of engine crankshaft rotation, said sensor signal being coupled to a control terminal of said controllable gate device.

4. An ignition spark timing circuit according to claim 3 wherein said controllable gate device is a transistor and wherein the control terminal of said gate device corresponds to the base of said transistor.

5. An ignition spark timing circuit according to claims, 1, 2, 3 or 4 wherein said ignition timing means produces said predeterminedly varying signal by, during each of said input sensor signal periods, initially varying this signal at a first predetermined rate having a first polarity and subsequently varying this signal at a final predetermined rate having an opposite polarity, whereby said rates determine the occurrence of spark ignitions.

6. An ignition spark timing circuit according to claim 5 wherein varying said predeterminedly varying signal at said final rate occurs during said critical portion of each of said input sensor signal periods, and wherein said initially varying said signal at said first rate occurs during said other portion of each of said input sensor signal periods.

7. An ignition spark timing circuit according to claim 6 wherein said threshold level during said other portion of each of said input sensor signal periods is fixed at a first low level, and within said critical portion of each of said input sensor signal periods said switchable hysteresis means and said comparison means output cause said threshold level to switch from a first low level to a second level having a larger absolute magnitude than first low level.

8. An ignition spark timing circuit according to claim 7 wherein said ignition timing means includes:
means coupled to said sensor means for receiving said input sensor signal and detecting the passage of at least a first predetermined period of time within said other portion of each of said input sensor signal periods; and
means for altering the rate of change of said predeterminedly varying signal to a second predetermined rate of change, having the same polarity as said first rate of change, in response to the occurrence of a detection of said first time period within said other portion of each of said input sensor signal periods.

* * * * *

UNITED STATES PATENT AND TRADEMARK OFFICE
CERTIFICATE OF CORRECTION

PATENT NO. : 4,241,708
DATED : December 30, 1980
INVENTOR(S) : Rupin J. Javeri

It is certified that error appears in the above—identified patent and that said Letters Patent is hereby corrected as shown below:

Col. 6, line 54, "ploted" should be --plotted--.

Col. 6, line 68, "log" should be --low--.

Col. 7, line 48, "94" should be --84--.

Col 12, line 14, "having" should have the word --signal-- inserted before it.

Signed and Sealed this

Fifth Day of May 1981

[SEAL]

Attest:

RENE D. TEGTMEYER

Attesting Officer    Acting Commissioner of Patents and Trademarks